United States Patent
Zeman et al.

(10) Patent No.: US 10,683,855 B2
(45) Date of Patent: Jun. 16, 2020

(54) METHOD FOR OPERATING AN AXIAL PISTON MACHINE OF SWASHPLATE DESIGN

(71) Applicant: Robert Bosch GmbH, Stuttgart (DE)

(72) Inventors: Paul Zeman, Vienna (AT); Adrian Trachte, Stuttgart (DE); Daniel Seiler-Thull, Stuttgart (DE); Martin Wegscheider, Ulm (DE); Peter Altermann, Stuttgart (DE); Andreas Kugi, Vienna (AT); Wolfgang Kemmetmueller, Vienna (AT)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 15/809,262

(22) Filed: Nov. 10, 2017

(65) Prior Publication Data
US 2018/0135605 A1    May 17, 2018

(30) Foreign Application Priority Data
Nov. 11, 2016   (DE) ................. 10 2016 222 139

(51) Int. Cl.
| | |
|---|---|
| *F04B 1/295* | (2020.01) |
| *G05B 13/02* | (2006.01) |
| *F04B 1/146* | (2020.01) |
| *F04B 49/08* | (2006.01) |
| *F04B 1/324* | (2020.01) |

(Continued)

(52) U.S. Cl.
CPC ............ *F04B 1/295* (2013.01); *F03C 1/0636* (2013.01); *F03C 1/0668* (2013.01);
(Continued)

(58) Field of Classification Search
CPC .......... F04B 1/295; F04B 1/20; F04B 1/2078; F04B 1/324; F04B 1/146; F04B 1/26;
(Continued)

(56) References Cited

U.S. PATENT DOCUMENTS

| | | | |
|---|---|---|---|
| 9,482,212 B1* | 11/2016 | Bethke | .............. F04B 1/2007 |
| 2002/0176784 A1* | 11/2002 | Du | ..................... F04B 1/324 |
| | | | 417/53 |

(Continued)

OTHER PUBLICATIONS

Acuna-Bravo et al.; Fine and simplified dynamic modelling of complex hydraulic systems; 2009 American Control Conf., St. Louis, MO; Jun. 10-12, 2009; IEEE; pp. 5480-5485 (Year: 2009).*

(Continued)

*Primary Examiner* — Michael J Zanelli
(74) *Attorney, Agent, or Firm* — Maginot, Moore & Beck LLP

(57) ABSTRACT

A method for operating an axial piston machine of swashplate design, in which a swashplate is settable by means of an adjustment device, and in which a controlled variable of the axial piston machine is regulated by predetermining a manipulated variable. Under the assumption of a constant intended value of the controlled variable, a future profile of the controlled variable is ascertained using a model of the axial piston machine in which respective current values of at least one operating variable of the axial piston machine, which comprises the controlled variable, and a current value of the manipulated variable are taken into account. A value to be set for the manipulated variable is ascertained and set taking into account the future profile of the controlled variable.

12 Claims, 5 Drawing Sheets

(51) Int. Cl.
| | |
|---|---|
| *F04B 49/00* | (2006.01) |
| *F04B 1/2078* | (2020.01) |
| *F04B 49/06* | (2006.01) |
| *F04B 1/20* | (2020.01) |
| *F04B 49/20* | (2006.01) |
| *F03C 1/40* | (2006.01) |
| *F03C 1/06* | (2006.01) |
| *G05B 13/04* | (2006.01) |

(52) U.S. Cl.
CPC .......... *F03C 1/0686* (2013.01); *F04B 1/146* (2013.01); *F04B 1/20* (2013.01); *F04B 1/2078* (2013.01); *F04B 1/324* (2013.01); *F04B 49/002* (2013.01); *F04B 49/065* (2013.01); *F04B 49/08* (2013.01); *F04B 49/20* (2013.01); *G05B 13/026* (2013.01); *G05B 13/048* (2013.01)

(58) Field of Classification Search
CPC ...... F04B 49/20; F04B 49/065; F04B 49/002; F04B 49/08; F03C 1/0668; F03C 1/0636; F03C 1/0686; G05B 13/048; G05B 13/026
See application file for complete search history.

(56) References Cited

U.S. PATENT DOCUMENTS

2011/0079006 A1* 4/2011 Du .................... F04B 49/14
  60/327
2017/0145991 A1* 5/2017 Rath .................. F04B 1/146

OTHER PUBLICATIONS

Zeman et al.; Mathematical Modeling and Analysis of a Hydrostatic Drive Train; ScienceDirect; IFAC PapersOnLine; 2015; pp. 508-513; www.sciencedirect.com.

Bock et al.; Real-Time Optimization for Large Scale Nonlinear Processes; Jun. 25, 2001; 201 Pages; Dissertation, University of Heidelberg.

Houska et al.; An auto-generated real-time iteraton algorithm for nonlinear MPC in the microsecond range; Automatica; Sep. 1, 2011; pp. 2279-2285; vol. 47; www.elsevier.com/locate/automatica.

H. G. Bock; Recent Advances in Parameter Identification Techniques for O.D.E.; 1983; pp. 95-121; Numerical Treatment of Inverse Problems in Differential and Integral Equations, Boston, MA, USA.

\* cited by examiner

METHOD FOR OPERATING AN AXIAL PISTON MACHINE OF SWASHPLATE DESIGN

This application claims priority under 35 U.S.C. § 119 to patent application no. DE 10 2016 222 139.6, filed on Nov. 11, 2016 in Germany, the disclosure of which is incorporated herein by reference in its entirety.

The disclosure relates to a method for operating an axial piston machine of swashplate design, in which a swashplate is settable by means of an adjustment device, and in which a controlled variable of the axial piston machine is regulated by predetermining a manipulated variable, and a computing unit for carrying out the method and such an axial piston machine.

BACKGROUND

The angle of the swashplate is adjusted in the case of axial piston units of swashplate design for the purposes of adapting the delivery volumetric flow. In this context, this angle is also referred to as the pivot angle. Various functions can be realized by this adjustment, e.g. a volumetric flow control, a rotational speed regulation or pressure regulation. This can be effectuated by way of a plurality of mechanisms, depending on the mechanical adjustment device (or actuation apparatus) and optionally on the sensor configuration. By way of example, this can be effectuated by way of an electronic pivot angle regulator which actuates a proportional directional control valve in a suitable manner or by way of an electro-proportional pivot angle adjustment, in which the pivot angle of the swashplate is predetermined by way of an actuation current of a proportional directional control valve with a mechanical spring return.

By way of example, an electronic regulator for improving the adjustment speed and the robustness over parameter variations and disturbances additionally can be superposed onto this electro-proportional adjustment. For the purposes of a rotational speed and pressure regulation, the pivot angle controller or regulator can either be superposed onto an electronic regulator (in a so-called cascade structure in such a case) or electrohydraulic pressure regulators can be used for the pressure regulation, for example. Electronic regulators can be superposed on these, in turn, for improving the adjustment speed and the robustness over parameter variations and disturbances.

SUMMARY

According to the disclosure, a method for operating an axial piston machine of swashplate design, a computing unit for carrying out the former, and an axial piston machine are proposed.

A method according to the disclosure serves to operate an axial piston machine of swashplate design, in which a swashplate is settable by means of an adjustment device, and in which a controlled variable of the axial piston machine is regulated by predetermining a manipulated variable. Here, in particular, a hydraulic adjustment cylinder comes into question as an adjustment device, said hydraulic adjustment cylinder being settable by means of an electromagnetic, in particular an electro-proportional valve. In particular, a pivot angle, a rotational speed, a pressure of the axial piston machine or a variable correlating therewith, such as e.g. an adjustment degree of the swashplate, can be considered as the controlled variable.

Even if the disclosure is described here and below in more detail on the basis of an electro-proportional adjustment with a superposed rotational speed regulation, an application is likewise possible for different types of adjustment of the pivot angle and the other aforementioned controlled variables.

Under the assumption of a constant intended value of the controlled variable, a future profile of the controlled variable can then be ascertained using a model of the axial piston machine in which respective current values of at least one operating variable of the axial piston machine, which at least comprises the controlled variable as well, and a current value of the manipulated variable are taken into account. Here, in particular, a rotational speed of the axial piston machine and/or an adjustment degree of the swashplate and/or operating variables of the adjustment device can be considered as operating variables. In the case of an adjustment cylinder with an electromagnetic or electro-proportional valve, the latter, in turn, may comprise a valve spool path and/or a pressure in the adjustment cylinder and/or a current in one or more coils (as part of one or more electromagnets) of the valve. Here, the operating variables can either be measured or else be estimated, for example using an estimator or filter.

Then, a value to be set for the manipulated variable can be ascertained and set taking into account the future profile of the controlled variable. Here, in particular, an actuation variable for actuating the adjustment device, which may comprise e.g. a voltage applied to the electromagnet or electromagnets in the case of an adjustment cylinder with an electromagnetic or electro-proportional valve, comes into question as the manipulated variable. Likewise, an intended current in a current regulation, in particular a subordinate current regulation, may be used as a manipulated variable. As a consequence, by using the model in which geometric dimensions of the axial piston pump and/or of the adjustment device can be taken into account and as will still be explained in more detail below, it is therefore possible to calculate the future profile of the controlled variable at least approximately in advance and thus have the controlled variable track the intended value as accurately as possible.

In this respect, it is also particularly expedient if the value to be set for the manipulated variable is ascertained using an optimization calculation, in which a deviation of the current value of the controlled variable from the intended value and the current value of the manipulated variable are taken into account. Here, in particular, maximum and/or minimum values can also be predetermined for the at least one operating variable and/or the manipulated variable.

In the case of an electro-proportional adjustment, the pivot angle of the swashplate is predetermined by means of the actuation current of a proportional directional control valve. The proportional directional control valve, in the process, sets the volumetric flow and also indirectly, the pressure in the adjustment cylinder. The pivot angle of the swashplate can be returned mechanically to the proportional directional control valve by way of a spring. As a result, a pivot angle emerges, which is substantially proportional to the actuation current and which can be kept within a control range by means of the mechanical return. As a result of this mechanical regulating device, a direct relationship arises between the pivot angle of the axial piston machine and the actuation current of the proportional directional control valve. This relationship is described by a characteristic, a so-called electro-proportional or EP characteristic. An electronic pivot angle regulator can be superposed on the electro-proportional adjustment with a mechanical control loop for an improved control behavior. Such a pivot angle regulator was found to be robust in respect of disturbance variables, parameter variations of the system and deviations in the EP characteristic. In comparison with a purely electro-proportional adjustment, the electronic regulator has an improved dynamic control behavior and consequently facilitates a high adjustment speed. This aspect is of importance, in particular, for a highly dynamic rotational speed regulation of the axial piston machine. In the case of a cascaded rotational speed regulation, the pivot angle regulator can be operated as a subordinate torque regulator. As a consequence, it directly influences the achievable dynamics of the entire rotational speed control loop.

For a model-based regulator, in particular a pivot angle regulator, a reduced model of the axial piston machine can be used, as is also known, for example, from "P. Zeman, W. Kemmetmüller, and A. Kugi. Mathematical modeling and analysis of a hydrostatic drivetrain. In proceedings of the 8$^{th}$ Vienna International Conference on Mathematical Modelling (MATHMOD), pages 518-523, Vienna, Austria, 18-20 Feb. 2015". Here, the following equations can be used:

$$\frac{d}{dt}\varphi = \frac{\cos^2\varphi}{r_V A_V} q_V(s_V, p_V),$$ (1a)

$$\frac{d}{dt}s_V = \frac{1}{k_V}(-(-c_V + c_F)s_V - F_F(\varphi) + F_m(i_m) - F_{jet}(s_V, p_V)),$$ (1b)

$$\frac{d}{dt}i_m = \frac{1}{L_m}(-R_m i_m + u_m).$$ (1c)

Here, $\varphi$ denotes the pivot angle which is set by way of the volumetric flow $q_V$ in the adjustment cylinder. Here, the dynamics of the pressure increase in the adjustment cylinder are assumed to be settled on account of the high dynamics. Moreover, the inertia of the pivot cradle is neglected on account of the large acting pressure forces. As a result of these simplifications, the adjustment depends directly on the inflowing volumetric flow $q_V$ and the geometry of the adjustment, which is considered by the term $\cos^2\varphi/r_V A_V$. Here, $r_V$ denotes the distance between the axis of rotation of the pivot cradle and the adjustment cylinder and $A_V$ denotes the pressure-effective surface in the adjustment cylinder. The geometric relationship between adjustment cylinder position and pivot cradle can differ depending on the construction and it is described here only in an exemplary manner. The volumetric flow $q_V$ depends on the valve spool position $s_V$ and the adjustment cylinder pressure $p_V$. The adjustment cylinder pressure can easily be estimated by way of a torque balance with counter-cylinders and springs.

Here, equation (1b) describes the reduced dynamics of the valve spool position $s_V$. Since the mass my of the spool is very small in comparison with the valve spool damping $k_V$, the order can be reduced from two to one in this case with the aid of the singular perturbation theory. The term $(c_V + c_F)s_V$ describes the spring forces acting on the valve spool, having the spring constants $c_V$ for the centering spring and $c_F$ for the spring for the mechanical return. The term $F_F(\varphi)$ describes the force of the mechanical return depending on the pivot angle, $F_m(i_m)$ describes the magnetic force depending on the effective coil current $i_m$ and $F_{jet}(s_V, p_V)$ describes the flow force depending on the valve spool deflection and the adjustment cylinder pressure $p_V$. An adaptation to axial piston machines having direct adjustment (i.e. elimination of the mechanical return) is likewise possible. To this end, the values $c_F$ and $F_F(\varphi)$ can be omitted from the model.

Furthermore, it is also possible to model other adjustments by a suitable adaptation of the model equations. By way of example, if use is made of pressure regulating valves, additional terms $F_p(p)$ must be added to the valve spool equation for the pressure forces.

Equation (1c) describes the current build-up equation of the magnets with the inductance $L_m$ and the electric resistance $R_m$. The voltage $u_m$ and the current $i_m$ are effective variables of the two coils. Here, positive values of $u_m$ and $i_m$ describe the current and the voltage in the first coil, while negative values then correspond to those in the second coil, provided that such a second coil is present. Here, the assumption is made that the coils have an identical design and are only subject to small variations such that a common resistance and a common inductance can be assumed. If this is not the case, a dedicated model should be used for each coil and the magnetic force in equation (1b) would then be calculated depending on the two coil currents $i_1$ and $i_2$.

In the case of the current as a manipulated variable, equation (1c) can denote, for example, the dynamics of the closed control loop for the current or, if the dynamics are sufficiently high, it can be neglected.

For the rotational speed regulation of the axial piston machine, the model of the pivot angle regulation, as illustrated by equations (1a), (1b), and (1c), can be extended by a differential equation for the rotational angle speed $\omega_t$ of the shaft of the axial piston machine:

$$\frac{d}{dt}\omega_t = \frac{1}{J_c}(c_0 p_H \tan(\varphi) - k_c \sin(\omega_t) - k_v \omega_t).$$

Here, $J_c$ denotes the moment of inertia of the shaft, $p_H$ denotes the supply pressure on the high-pressure side and $c_0$ denotes the delivery volume per radian in the case of an adjustment of 100%. For a friction model, a simple approach is used, having a Coulomb component $k_c$ and a viscous component $k_v$.

Accordingly, for the purposes of the pressure regulation by way of the axial piston machine, the model as represented by equations (1a), (1b), and (1c) can be extended by a differential equation for the pressure p:

$$\frac{d}{dt}p_H = \frac{K}{V}(Q_A(\varphi) - Q_L - Q_\eta).$$ (3)

Here, K denotes the bulk modulus, V denotes the (variable) volume, $Q_K$ denotes the volumetric flow of the axial piston machine which depends, inter alia, on the pivot angle $\varphi$, $Q_L$ denotes the hydraulic load and $Q_\eta$ denotes loss components. If the load and/or the loss components are not sufficiently well known, they can be estimated by a disturbance observer.

The models for the pivot angle, rotational speed and pressure regulation can be described as a general nonlinear SISO (single input single output) system according to $$\dot{x}=f(x,u),$$ (4a)

$$y=h(c),$$ (4b)

with the control input $u=u_m$. The state x (as a vector), the right-hand side f and the output y of the regulator model emerge depending on the operating mode as a pivot angle or rotational speed regulator, as explained below.

In the case of the pivot angle regulator, $$x=[\varphi,s_V,i_m]^T \text{ and } \varphi$$

emerge for the state x or the output y, while this is $$x=[\omega_t,\varphi,s_V,i_m]^T \text{ and } \omega_t$$

in the case of a rotational speed regulator and $$x=[p_H,\varphi,s_V,i_m]^T \text{ and } p_H$$

in the case of a pressure regulator. Here, the aforementioned equations (1a), (1b), and (1c), possibly extended by the aforementioned differential equations (2) and (3), emerge in each case as the right-hand side f.

The object of the model-predictive trajectory slave control now is to actuate the system in such a way that it follows an externally predetermined intended signal $y_r(t)$ (here, within the meaning of an intended value for the controlled variable). The current state $\hat{x}_k$ of the model can be measured or reconstructed with the aid of an observer at a sampling time $t_k$. The regulation problem can be formulated for both modes of operation as a dynamic optimization problem:

$$\min_{u(\cdot)} J(x'_k, u(\cdot)) = \int_{t_k}^{t_k+T} l(x(\cdot), u(\cdot), \tau)d\tau + V(x(t_k+T)) \tag{5a}$$

with the following constraints:

$$\forall \tau \in [t_k, t_k+T]: \dot{x}=f(x(\tau),u(\tau)), x(t_k)=\hat{x}_k, \tag{5b}$$

$$u(\tau) \in U, \tag{5c}$$

$$x(\tau) \in X. \tag{5d}$$

The current state $\hat{x}_k$ serves as the initial state for predicting the system state within the time horizon T. For the purposes of realizing a trajectory slave control, the quality functional J with the Lagrangian density l and final cost term V should be selected in a suitable manner, for example in the form:

$$J(x'_k, u(\cdot)) = \int_{t_k}^{t_k+T} Q(y(\tau) - y_r(\tau))^2 + \tag{6}$$

$$R(u(\tau) - u_r(\tau))^2 d\tau + P(y(t_k+T) - y_r(t_k+T))^2$$

with parameters $Q, P, R \in \square^+$. A high weighting of the predicted sequential disturbances $y(\tau)-y_r(\tau)$ by way of the weighting parameters Q and P causes the output of the system to follow the intended signal. Since the future profile of the intended signal $y_r(t)$ is not known in advance for $t > t_k$, a constant intended profile with the currently available intended value $y_r(t_k)$ is assumed within the prediction horizon $$y_r(\tau) \approx y_r(t_k), \forall \tau \in [t_k, t_k+T]. \tag{7}$$

This approximation is particularly suitable for short time horizons, as occur in the considered application. The manipulated variable component of the aforementioned quality functional (6) with the weighting parameter R represents a regularization term, with the aid of which strongly oscillating manipulated variable prescriptions can be avoided. These are already caused by very small noise amplitudes in the measured or estimated state $\hat{x}_k$. Here, the deviation of the manipulated variable from a predetermined reference profile $u_r(t)$ is weighted. In the considered application, this is the necessary stationary voltage, which is known from the EP characteristic of the axial piston machine. The constraints (5c) and (5d), as mentioned above, are used to take account of manipulated variables and state constraints in the optimal control problem.

Various numerical methods exist for solving the optimal control problem according to equations (5a), (5b), (5c), and (5d). According to Pontryagin's maximum principle, the optimal solution of equations (5a), (5b), (5c), and (5d) must satisfy the necessary optimality conditions for dynamic optimization problems, as they are mentioned e.g. in "M. Papageorgiou, M. Leibold, and M. Buss. Optimierung: Statische, dynamische, stochastische Verfahren für die Anwendung. [Optimization: Static, dynamic and stochastic methods for the application]. Springer Berlin Heidelberg, 2012".

If the Hamilton function is defined as $$H(x,u,\lambda,t)=l(x,u,t)+\lambda^T f(x,u), \tag{8}$$

it follows from Pontryagin's maximum principle that there exists a unique $\lambda^*(t)$ for the optimal solution $u=u^*(t)$ with the associated state trajectory $x^*(t)$ such that the canonical equations $$\forall \tau \in [t_k, t_k+T]: \dot{x}^* = \left(\frac{\partial H}{\partial \lambda}\right)^T (x^*, u^*, \lambda^*, t) = f(x^*, u^*), \tag{9a}$$

$$\dot{\lambda}^* = -\left(\frac{\partial H}{\partial x}\right)^T (x^*, u^*, \lambda^*, t) = -\left(\frac{\partial l}{\partial x}\right)^T (x^*, u^*, t) - \left(\frac{\partial f}{\partial x}\right)^T (x^*, u^*)\lambda^*, \tag{9b}$$

are satisfied under the boundary condition $$x^*(t_k) = \hat{x}_k, \tag{9c}$$

$$\lambda^*(t_k+T) = \left(\frac{\partial V}{\partial x}\right)^T (x^*(t_k+T)). \tag{9d}$$

The system of differential equations (9b) is referred to as the adjunct system with the adjunct state $\lambda$. So-called indirect methods proceed from the necessary conditions of equations (9a), (9b), (9c), and (9d) and solve the typically occurring two point boundary value problems.

For the purposes of realizing a real-time-capable regulator, it is possible to use, for example, the projected gradient method described in "K. Graichen, M. Egretzberger, and A. Kugi. A suboptimal approach to real-time model predictive control of nonlinear systems. at-Automatisierungstechnik, 58(8):447-457, 2010". Here, the two aforementioned systems of differential equations (9a) and (9b) are alternately numerically integrated forward and backward in time by iterations using Heun's method.

As a suboptimal method, it is terminated after a predeterminable number of iterations. In the considered case of a model-predictive regulation, the algorithm is initialized in the current sampling step using the solution of the preceding sampling step. Hence, a small number of iterations already suffices and the suboptimal solution represents a very good approximation of the optimal solution. Using the method, it is possible to take account of the aforementioned input constraints (5c) for u in the form of so-called box constraints $U=[u_{min}; u_{max}]$. The state constraints (5d) can be taken account in indirect methods by means of so-called penalty functions in the quality functional (6), as described, for example, in "J. Nocedal and S. J. Wright. Numerical Optimization. Springer, New York, 1999". However, since the convergence property of the method is adversely affected in the process, a direct method for solving the optimal control problem of equations (5a) (5b), (5c), and (5d) should also be described below.

In contrast to the indirect methods, direct methods approximate the optimal control problem of equations (5a), (5b), (5c), and (5d) by a static optimization problem. The latter is subsequently solved using numerical methods from static optimization. A possible solution variant to this end is presented below. As described e.g. in "M. Diehl. Real-Time Optimization for Large Scale Nonlinear Processes. Dissertation, Heidelberg University, 2001", there is a discretization of the prediction horizon in the form of a temporal grid with N sub-intervals of the duration T/N. The manipulated variable is set to be constant in each of these intervals and these degrees of freedom are combined in the manipulated variable vector $U^T=[u_0, u_1, \ldots, u_{N-1}]$.

This selection consequently defines a piecewise continuous manipulated variable profile. Furthermore, the vector $X^T=[x^T_0, x^T_1, \ldots, x^T_N]$ is introduced and considered to be an approximation of the state trajectory at the points of the temporal grid. Under these assumptions, the static problem formulation for the quality functional of equations (5a), (5b), (5c), and (5d) is $$\min_{U,X} \sum_{j=0}^{N-1} l_j(u_j, x_j) + V(x_N) \quad (10a)$$

with the constraints $$x_{j+1}=\Phi_j(x_j,u_j), j=0,1,\ldots,N-1, x_0=x_k' \quad (10b)$$

$$X \in \mathcal{X} \quad (10c)$$

$$U \in \mathcal{U}. \quad (10d)$$

The terms of the sum $l_j$ in (10a) represent a suitable approximation of the continuous cost functional (5a). The way (10b) is written expresses the fact that the state at the end of the sub-interval is calculated by a numerical integration method. Specifically, the numerical methods which also underlie the software tool described in "B. Houska, H. J. Ferreau, and M. Diehl. An auto-generated real-time iteration algorithm for nonlinear MPC in the microsecond range. Automatica, 47(10): 2279-2285, 2011" are suitable as real-time-capable methods for model-predictive regulations. What is exploited here is that the discretized quality functional (6) can be represented in a so-called nonlinear least-squares form. By application of the generalized Gauss-Newton method, as described in "H. G. Bock. Recent advances in parameter identification techniques for o.d.e. In P. Deuflhard and E. Hairer, editors, Numerical Treatment of Inverse Problems in Differential and Integral Equations, Boston, 1983. Birkhauser", it is possible to obtain a simple approximation of the Hesse matrix of the problem. In the case of the considered application, the single-shooting formulation is suitable; here, the state vector X in the optimization problem of equations (10a), (10b), (10c), and (10d) is represented dependent on the manipulated variable vector U and hence the dimension of the optimization problem to be solved is reduced.

Consequently, a quadratic program (QP) has to be solved, which can be effectuated with the aid of ready-made software packages, so-called QP optimizers. The advantage of the direct methods in comparison with the indirect methods is that state constraints can be included in the formulation of the problem of the static optimization problem as inequality constraints. If state constraints are present, they are therefore distinguished by, in general, an improved convergence behavior of the solution algorithm. The two pivot angle and rotational speed regulation modes of operation can be realized using the described indirect or direct method, which are denoted by their abbreviations below and in the description of the figures for better distinguishability:

This relates, firstly, to the IPG method (indirect projected gradient method), as described in "K. Graichen, M. Egretzberger, and A. Kugi. A suboptimal approach to real-time model predictive control of nonlinear systems. at-Automatisierungstechnik, 58(8):447-457, 2010", and, secondly, to the DSS method (direct single shooting method), which applies the algorithms described in "H. G. Bock. Recent advances in parameter identification techniques for o.d.e. In P. Deuflhard and E. Hairer, editors, Numerical Treatment of Inverse Problems in Differential and Integral Equations, Boston, 1983. Birkhauser", in "M. Diehl. Real-Time Optimization for Large Scale Nonlinear Processes. Dissertation, Heidelberg University, 2001", and in "B. Houska, H. J. Ferreau, and M. Diehl. An auto-generated real-time iteration algorithm for nonlinear MPC in the microsecond range. Automatica, 47(10): 2279-2285, 2011".

A computing unit according to the disclosure, for example a control apparatus of an axial piston machine, is configured, in particular by program-technical means, to carry out a method according to the disclosure.

An axial piston machine of swashplate design according to the disclosure has an adjustment device, by means of which a swashplate is settable, and has a computing unit according to the disclosure.

The implementation of the method in the form of a computer program is also advantageous since this results in particularly low costs, particularly if an executing control apparatus is still used for further tasks and therefore present in any case. Suitable data mediums for providing the computer program are, in particular, magnetic, optical and electrical storage devices, such as e.g. hard disk drives, flash memories, EEPROMs, DVDs, and many more. Downloading a program via computer networks (Internet, intranet, etc.) is also possible.

Further advantages and configurations of the disclosure emerge from the description and the attached drawing.

It is understood that the features specified above and the features yet to be explained below can be used not only in the respectively specified combination but also in other combinations or on their own, without departing from the scope of the disclosure.

The disclosure is presented schematically in the drawing on the basis of exemplary embodiments and will be described in detail below with reference to the drawing.

DETAILED DESCRIPTION

Figure 1:
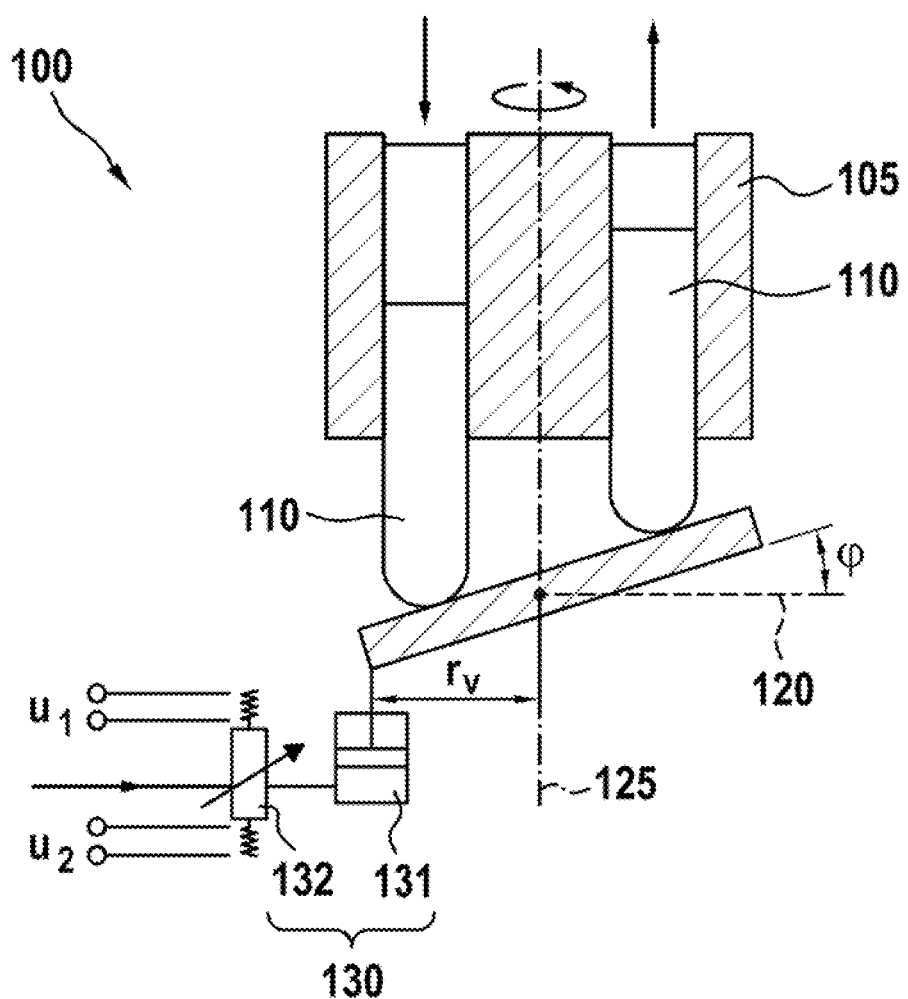
FIG. 1 schematically shows an axial piston machine, by means of which a method according to the disclosure can be carried out.

FIG. 1 schematically illustrates an axial piston machine 100, here in the form of an axial piston pump, of swashplate design. In the cross-sectional view shown, two pistons 110 are shown, which are guidable in the housing 105 and which are supported on a swashplate 120. During operation as a pump, the housing 105 and hence also the pistons 110 are rotated about the axis of rotation 125.

In this manner, fluid is suctioned in on the side of the piston 110 illustrated here on the left-hand side, said fluid being compressed by the rotation and being output on the side of the piston 110 illustrated here on the right-hand side.

The swashplate 120 and hence the pivot angle $\varphi$ can be adjusted by means of an adjustment device 130. Here, the adjustment device 130 comprises an adjustment cylinder 131, which engages with the swashplate 120 at a distance $r_V$ from a pivot cradle of the swashplate, and an electro-proportional valve 131 with two coils or electromagnets, to which the voltages $u_1$ and $u_2$, respectively, can be applied, and which serves to set or regulate the adjustment cylinder pressure in the adjustment cylinder 130.

Figure 2:
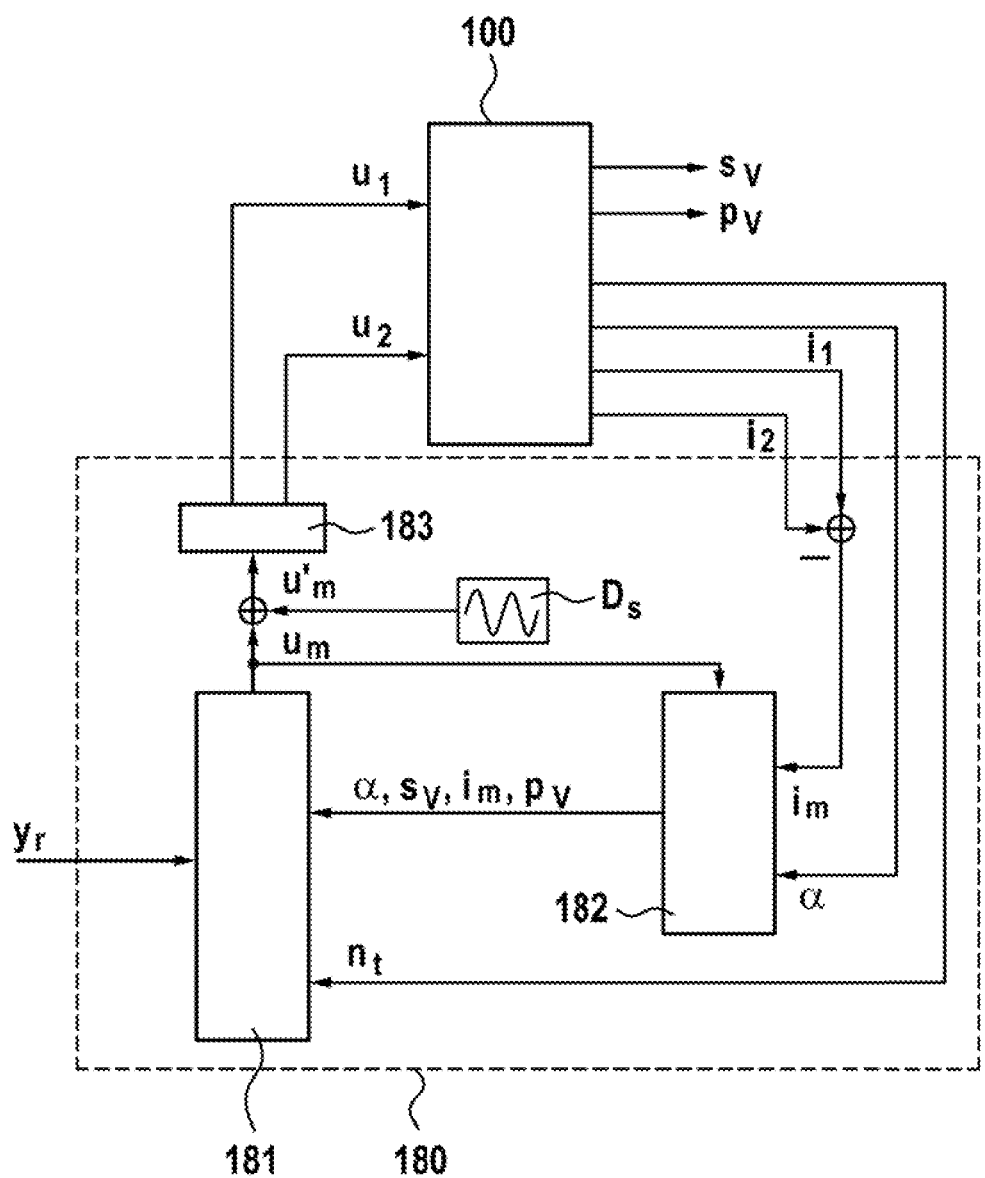
FIG. 2 schematically shows a course of the method according to the disclosure in a preferred embodiment.

FIG. 2 schematically illustrates a course of the method according to the disclosure in a preferred embodiment, by means of which it is simultaneously also possible to explain a structure and a measurement setup for the model-predictive regulation carried out within the scope of the disclosure, using the example of an axial piston machine having an electro-proportional adjustment as shown in FIG. 1.

A regulator 181, which may be part of a computing unit or a control apparatus 180, receives an intended value $y_r$ as an input. From this, it is possible to ascertain an actuating signal or a value for the manipulated variable $u_m$. In order to prevent adhesion in the regulation valve, a so-called dither signal $D_S$ can be superposed onto the actuating signal $u_m$ of the regulator 181. With the aid of the block 183, the resultant signal $u'_m$ can be converted into the two voltages $u_1$ and $u_2$ of the coils.

The currents $i_1$ and $i_2$ of the two coils, the adjustment degree $\alpha = \tan(\varphi)/\tan(\varphi_{max})$ and the rotational speed $n_r = \omega_r/(2\omega)$ form measured variables at the axial piston machine 100 for the regulator 181 in this case. Here, the two currents $i_1$ and $i_2$ are combined to a current $i_m$ by calculation. The valve spool position $s_V$ of the valve and the adjustment cylinder pressure $p_V$ are defined as non-measurable variables for the subsequent application and reconstructed or estimated using an extended Kalman filter 182 as an observer. However, within the scope of trials or a test setup, these may also be measured for comparison purposes; however, they are not included in the calculation of the regulating algorithm.

In order to suppress disturbances and parameter variations, the observer can be extended by a disturbance variable model with a constant disturbance. As a consequence, the stationary accuracy of the regulation can be improved.

Figure 3:
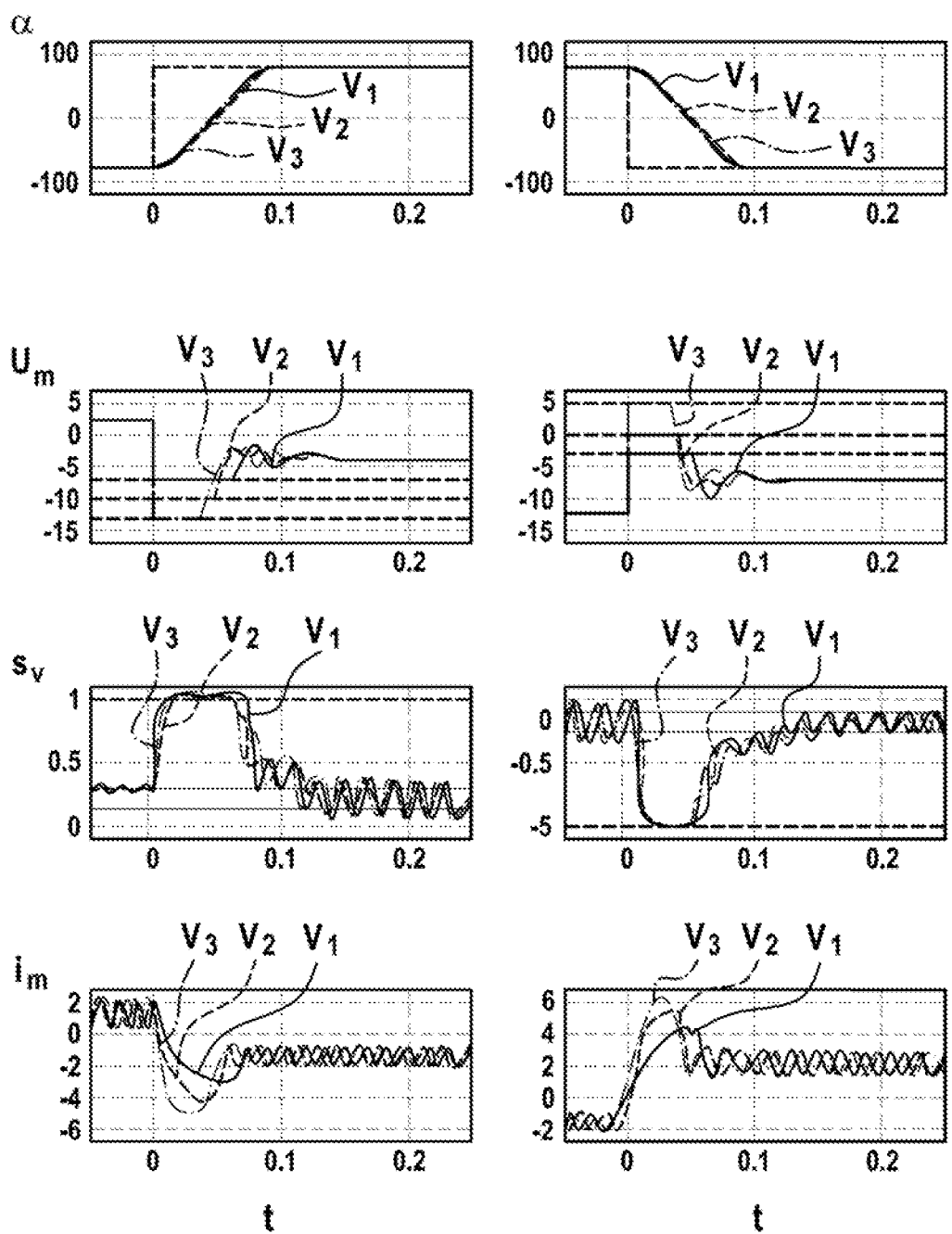
FIG. 3 shows measurement results when carrying out a method according to the disclosure in a preferred embodiment.

FIG. 3 illustrates measurements using the pivot angle regulator according to the aforementioned IPG method. To this end, the adjustment degree $\alpha$ in %, the voltage $u_m$ in V, the valve spool position $s_V$ in mm and the current $i_m$ in A are plotted, over time t in s in each case. Here, the reference signs $V_1$, $V_2$ and $V_3$ are used to denote the respective variable profiles for voltage restrictions of 7 V, 10 V and 13 V, as also indicated in the diagrams in the second row from the top by means of dashed lines.

Here, the dashed line in the diagrams in the first row from the top represent intended values for the adjustment degree; the dashed line in the diagrams in the third row from the top represent a stop restriction.

It is clearly visible that the regulator always drives into the manipulated variable constraint and therefore realizes the maximum possible adjustment speed. Similar results can also be obtained using the DSS method.

Figure 4:
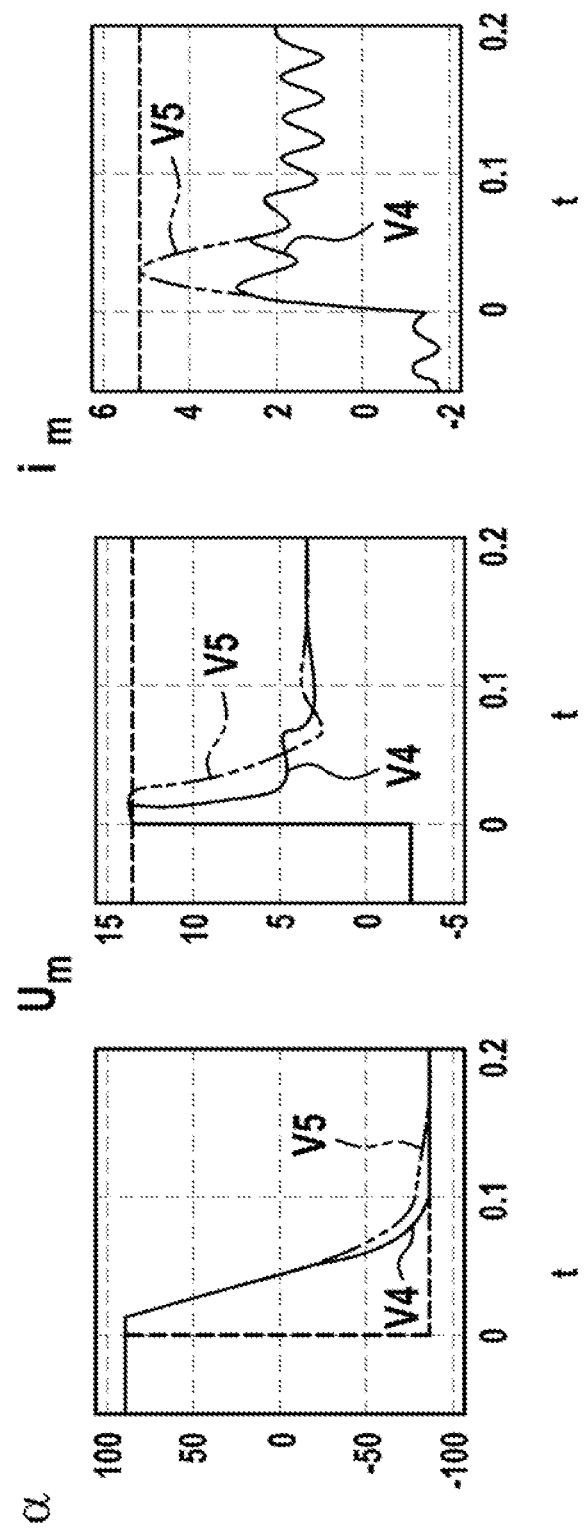
FIG. 4 shows measurement results when carrying out a method according to the disclosure in a further preferred embodiment.

FIG. 4 illustrates a measurement for a pivot angle regulation using the DSS method, in which a state constraint for the current in the regulator is taken into account. Here, the adjustment degree $\alpha$ in %, the voltage $u_m$ in V and the current $i_m$ in A are plotted, over the time t in s in each case. Here, the reference signs $V_4$ and $V_5$ denote the respective variable profiles for current restrictions of 2 A and 5 A, as also indicated in the right-hand diagram by means of a dashed line.

The effect of the restriction of the measured current $i_m$ can be clearly identified. The time-averaged current profile is restricted on account of the superposed dither signal. As soon as the current limit has been reached, the regulator reduces the voltage.

Figure 5:
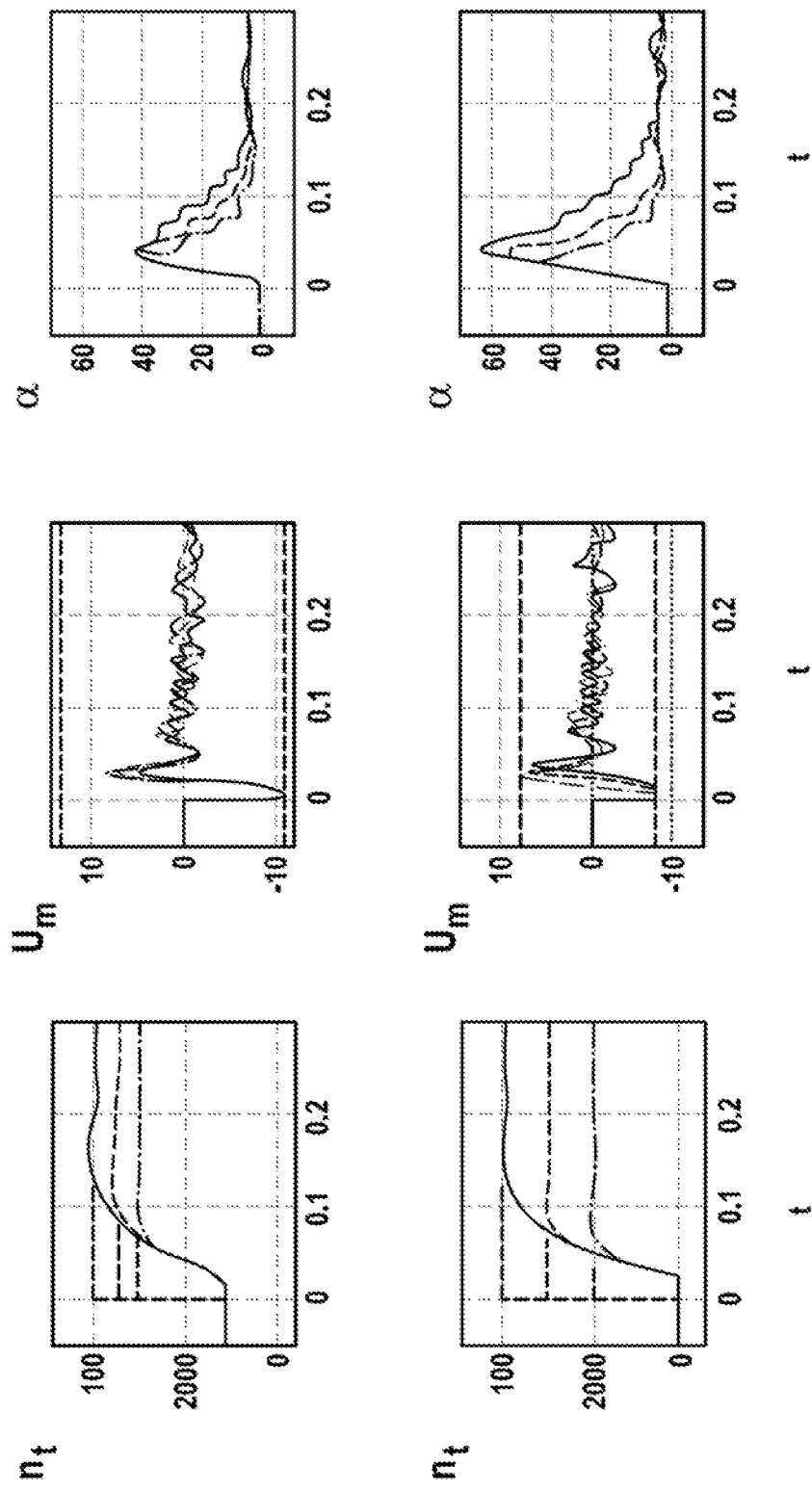
FIG. 5 shows measurement results when carrying out a method according to the disclosure in a further preferred embodiment.

FIG. 5 illustrates measurements using the rotational speed regulator according to the IPG method. Here, a rotational speed $n_r$ in 1/min, the voltage $u_m$ in V and the adjustment degree $\alpha$ in % are plotted, over the time t in s in each case. Here, discontinuous intended prescriptions with different target rotational speeds are considered in each case.

Here too, it is possible to identify that the regulator is able to take into account the constraint on the manipulated variable. Further, the diagrams in the second row from the top illustrate an acceleration of the axial piston machine from a standstill position. This represents a particular challenge for the regulator on account of the high coefficient of static friction in the shaft of the axial piston machine.

Now, in particular, the proposed method can be used for the pivot angle adjustment, the rotational speed regulation and the pressure regulation for any axial piston machine of swashplate design.

An example of such an application lies in the use for vehicles with partial or complete hydraulic power transfer by way of axial piston machines. Using the pivot angle regulator, it is possible to regulate the volumetric flow. If the axial piston machine can be decoupled from the drivetrain by way of a switchable coupling, it is possible to synchronize the rotational speed with that of the drivetrain by way of the rotational speed regulator.

It is possible to set the drive torque of the axial piston machine by way of a pressure regulation. When the axial piston machine supplies work hydraulics, it is likewise possible, by way of the proposed method, to set the volumetric flow and hence, for example, also the adjustment speed or the pressure and hence, for example, the force on the actuator in turn.

What is claimed is:

1. A method for operating an axial piston machine having a swashplate comprising:
    setting the swashplate with an adjustment device;
    regulating a controlled variable of the axial piston machine by predetermining a manipulated variable;
    ascertaining, under an assumption of a constant intended value of the controlled variable, a future profile of the controlled variable using a model of the axial piston machine in which respective current values of at least one operating variable of the axial piston machine, which comprises the controlled variable, and a current value of the manipulated variable are taken into account; and ascertaining and setting a value to be set for the manipulated variable by taking into account the future profile of the controlled variable.

2. The method according to claim 1, further comprising: ascertaining the value to be set for the manipulated variable using an optimization calculation, in which a deviation of the current value of the controlled variable from the constant intended value and the current value of the manipulated variable are taken into account.

3. The method according to claim 1, wherein a pivot angle, a rotational speed, a pressure of the axial piston machine or a variable respectively correlating therewith is used as the controlled variable.

4. The method according to claim 1, further comprising: taking into account geometric dimensions of the axial piston machine and/or of the adjustment device in the model of the axial piston machine.

5. The method according to claim 1, further comprising: using a hydraulic adjustment cylinder and an electro-proportional valve for setting the adjustment cylinder as the adjustment device.

6. The method according to claim 1, wherein the at least one operating variable of the axial piston machine comprises a rotational speed of the axial piston machine and/or a degree of adjustment of the swashplate and/or operating variables of the adjustment device.

7. The method according to claim 1, wherein the manipulated variable comprises an actuation variable for actuating the adjustment device.

8. The method according to claim 1, further comprising: predetermining maximum and/or minimum values for the at least one operating variable and/or the manipulated variable.

9. The method according to claim 1, wherein a computing unit having a regulator is configured to carry out the method.

10. The method according to claim 1, wherein a computer program prompts a computing unit to carry out the method when the computer program is executed on the computing unit.

11. The method according to claim 10, wherein the computer program is stored on a machine-readable storage medium.

12. An axial piston machine comprising:
a swashplate;
an adjustment device configured to set the swashplate; and
a computing unit configured to execute program instructions for
setting the swashplate with the adjustment device,
regulating a controlled variable of the axial piston machine by predetermining a manipulated variable,
ascertaining, under an assumption of a constant intended value of the controlled variable, a future profile of the controlled variable using a model of the axial piston machine in which respective current values of at least one operating variable of the axial piston machine, which comprises the controlled variable, and a current value of the manipulated variable are taken into account, and
ascertaining and setting a value to be set for the manipulated variable by taking into account the future profile of the controlled variable.

* * * * *